United States Patent [19]

Verwey et al.

[11] Patent Number: 5,599,873
[45] Date of Patent: Feb. 4, 1997

[54] FLUORINATED POWDER COATINGS FOR GALVANIZED STEEL

[75] Inventors: Edwin Verwey, Leiden; Ludwig K. Rijkse, Hoofddorp, both of Netherlands; Michel Gillard, Corroy-le-Chateau, Belgium

[73] Assignee: Fina Research, S.A., Feluy, Belgium

[21] Appl. No.: 355,782

[22] Filed: Dec. 14, 1994

[30] Foreign Application Priority Data

Dec. 23, 1993 [BE] Belgium .................. 93870242

[51] Int. Cl.⁶ .................. C08L 27/12; C08L 33/10
[52] U.S. Cl. .................. 524/545; 524/546; 524/904; 525/199; 525/214; 525/934
[58] Field of Search .................. 524/545, 546, 524/904; 525/934, 199, 276

[56] References Cited

U.S. PATENT DOCUMENTS

| | | | |
|---|---|---|---|
| 4,770,939 | 9/1988 | Sietses et al. | 524/520 |
| 5,030,394 | 7/1991 | Sietses et al. | 524/520 |
| 5,093,427 | 3/1992 | Barber | 525/276 |
| 5,177,150 | 1/1993 | Polek | 525/199 |
| 5,229,460 | 7/1993 | Yousef et al. | 524/904 |

FOREIGN PATENT DOCUMENTS

| | | |
|---|---|---|
| 0456018 | 11/1991 | European Pat. Off. . |
| 3284942 | 12/1991 | Japan . |

Primary Examiner—Tae Yoon
Attorney, Agent, or Firm—Michael J. Caddell; M. Norwood Cheairs

[57] ABSTRACT

Vinylidene fluoride copolymers having a melting temperature below about 160° C. are used to prepare pigmented powder coatings for galvanized steel. The coatings are corrosion-resistant and generally show a high gloss.

7 Claims, No Drawings

FLUORINATED POWDER COATINGS FOR GALVANIZED STEEL

CROSS REFERENCE TO RELATED APPLICATION

This application claims priority of previously filed copending Belgian application, Ser. No. 93870242.0, entitled "Fluorinated powder coatings for galvanized steel", filed Dec. 23, 1993; which prior application is hereby incorporated by reference herein, in its entirety.

BACKGROUND OF THE INVENTION

The present invention relates to fluorinated powder coating products, and to a process for coating galvanized steel with a fluorinated powder coating. In particular, the present invention relates to the use of vinylidene fluoride copolymers in pigmented powder coating products, for obtaining corrosion-resistant PVdFC-based protective coatings on galvanized steel.

Coatings based on vinylidene fluoride polymers (hereinafter PVdF) are known to be very useful as protective coatings for a variety of substrates due to the good chemical and weathering resistance and to the thermal stability of PVdF. The general known technique for preparing them is to prepare a dispersion of PVdF in a suitable solvent for application by known means onto the required substrate which is thereafter subjected to a heat treatment.

The solvent used is generally known in the prior art as "latent solvent", and it is described therein as an organic solvent which has no significant action on PVdF at room However, although the known systems may give good results, environmental protection laws throughout the world, but mainly in Europe and in the U.S.A., are making it increasingly difficult to handle solvent-based systems. Further, the recovery of the solvent is a costly procedure. Accordingly, there is a need in the art for solventless PVdF-based coatings.

British Patent GB 2194539-A discloses pigmented PVdF-based powder coating products essentially consisting of vinylidene fluoride homopolymer (or copolymer with at most 10 wt % of comonomer units), one or more compatible thermoplastic resins and one or more pigments. It also discloses a process for preparing the products. However, the required baking temperature is unacceptably high.

European Patent EP-456018-A discloses pigmented powder coatings of vinylidene fluoride/hexafluoropropene copolymers, the resin component comprising 50-90 wt % of said copolymers having a melt viscosity of 1-4 kPoise at $100^{-1}$ and 232° C., said copolymers being characterized by a melting point in the range of about 160° C. to about 170° C. and 50-100 wt % of thermoplastic acrylic resin. The resulting coatings are said to be characterized by improved flexibility, crack resistance and surface smoothness (as opposed to surface roughness or "orange peel" associated with the finish) while not requiring the inclusion of a flow-improving agent. However, the requisite baking temperature is also unacceptably high for use on galvanized steel.

Indeed, galvanized steel should not be heated above 200° C. (J. Van Eijnsbergen, Galvano-Organo 61(629)775–8, 1992), and the higher temperatures required to bake PVdF-based powder coatings has up to now prevented their use on galvanized steel. There is thus a need in the art for lower temperature application, fluorinated powder coatings for galvanized steel, said coatings having good anticorrosive properties.

It is an object of the invention to provide low temperature fluorinated powder coatings for galvanized steel.

Another object of the invention is to provide low temperature fluorinated powder coatings for galvanized steel, said coatings having good anticorrosive properties.

A further object of the invention is to provide low temperature powder coatings for galvanized steel, said coatings having high gloss.

Yet another object of the invention is to provide a process for coating galvanized steel with a fluorinated powder coating.

Accordingly, the present invention provides a pigmented PVdF-based powder coating product for galvanized steel, essentially consisting of:

(a) a resin component essentially consisting of:
   (i) from 60 to 90 wt % of one or more vinylidene fluoride copolymers having a melting temperature below about 160° C.;
   (ii) from 40 to 10 wt % of one or more compatible resins; and,
(b) from 1 to 35 parts by weight of one or more pigments per 100 parts by weight of the resin component.

DESCRIPTION OF THE PREFERRED EMBODIMENTS

The present invention provides for the use of copolymers such as vinylidene fluoride copolymers having a melting temperature below about 160° C. in pigmented powder coating products for galvanized steel, said products being capable of providing corrosion-resistant protective coatings which may in addition have a high gloss. High gloss coatings, as used herein, are coatings having a gloss of more than 40 when measured according to ISO 2813 at an angle of 60°, preferably, a gloss value of more than 50, and most preferably of more than 60. The present invention also provides a process for coating galvanized steel with a fluorinated powder coating product, said product essentially consisting of:

(i) a resin component essentially consisting of:
   (a) from 60 to 90 wt % of one or more vinylidene fluoride copolymers having a melting temperature below about 160° C.;
   (b) from 40 to 10 wt % of one or more compatible resins; and,
(ii) from 1 to 35 parts by weight of one or more pigments per 100 parts by weight of the resin component.

The vinylidene copolymers used herein are the copolymers prepared from 70 to 99% by weight of vinylidene fluoride (VdF) monomers with 1 to 30% by weight of one or more fluorinated comonomers such as tetrafluoroethylene (TFE), chlorotrifluoroethylene, vinyl fluoride, hexafluoropropene (HFP), and $FC_3—CF_2—CF=CF_2$; and having a melting temperature below about 160° C., preferably below 150° C. and most preferably below 140° C. Preferred copolymers are prepared from 75 to 95% by weight of vinylidene fluoride monomer, most preferably from 80 to 90 wt %. Preferred comonomers are TFE and HFP.

In one of the preferred embodiments, VdF/HFP copolymers are used, said copolymers having a melting temperature $(T_M)$ of about $107+68\ e^{-0.141X}$ wherein X is the amount of HFP monomer, expressed in % by weight, in the copolymer as calculated from NMR data by the method of Pianca et al. (Polymer 28, 224–30, 1987). Such copolymers are known in the art and need not be described in greater detail. They are characterized by a lower melting point for a given content of HFP comonomer. While not wishing to be bound by a theory, it would appear that high gloss does not result directly from a lower melting temperature because the melt flow index, which reflects the melt viscosity, is essentially independent of the melting temperature. In any case, one skilled in the art would not have expected that a lower melting point would be responsible for a higher gloss. Indeed, it is known from U.S. Pat. No. 4,179,542 to Pennwalt that the use of fluxing agents (i.e., high boiling latent solvents for PVdF) lower the observed melting point of PVdF at temperatures above 60° C., while the powder coating compositions disclosed in European Patent EP-284996-A and containing more than 40% of such agent are not reported to have a high gloss.

In another preferred embodiment, VdF/HFP copolymers are used, said copolymers having polydispersity values $U_z$ lower than 1.0, preferably equal to about 0.9, and $U_n$ lower than 1.7, preferably lower than 1.6, most preferably lower than 1.5. As used herein, $U_z$ is equal to $(M_z/M_w)-1$ and $U_n$ is equal to $(M_w/M_n)-1$, wherein $M_z$ is the z-average molecular weight, $M_n$ the number-average molecular weight and $M_w$ the weight-average molecular weight; all molecular weights being determined by GPC (gel permeation chromatography).

In a third preferred embodiment, the copolymers used have a tensile modulus lower than 800 MPa, preferably lower than 600 MPa, most preferably lower than 400 MPa, when measured according to ASTM D-638.

In a fourth preferred embodiment, the copolymers used have a melt viscosity greater than about 400 Pa-s measured at 100 $\sec^{-1}$ and 232° C. using ASTM D-3825 test method, preferably greater than about 400 Pa-s at 100 $\sec^{-1}$ and 240° C. but smaller than about 1300 Pa-s at 100 $\sec^{-1}$ and 232° C., most preferably greater than about 600 Pa-s at 100 $\sec^{-1}$ and 240° C. but smaller than about 1000 Pa-s at 100 $\sec^{-1}$ and 232° C.

Preferred VdFC resins are those having a weight-average molecular weight (as determined by GPC) in the range of from 50,000 to 270,000, most preferably from 90,000 to 160,000, and a melt flow index (according to ASTM D-1238 at 230° C. with a 5 kg weight) of from 5 to 30 g/10 min, most preferably from 6 to 20 g/10 min.

The VdFC is mixed with one or more compatible resins, preferably of the acrylic type. Acrylic resins are known in the art and need not be described here, although a description may be found in the French Patent FR-2,636,959-A (from line 18 of page 3 to line 14 of page 4). As examples of thermosetting acrylic resin, there may in addition be cited those described in U.S. Pat. No. 4,659,768 to DeSoto, particularly under the denominations "Experimental resin" and "control resin". U.S. Pat. No. 4,659,768 and FR 2,636, 959A are hereby incorporated herein by reference. It has, however, been found that it is advantageous to use a thermoplastic acrylic resin, and most advantageous to use a thermoplastic polymethylmethacrylate (PMMA) resin which is therefore preferred. As a thermoplastic PMMA resin, there may be used a thermoplastic resin obtained by (co) polymerization of at least 75 wt % of an alkyl methacrylate, the other comonomers being one or more olefinically unsaturated comonomers, preferably of the alkyl (meth)acrylate type. The esters are formed by the reaction of the acrylic or methacrylic acid with suitable alcohols, for example, methyl alcohol, ethyl alcohol, propyl alcohol, butyl alcohol and 2-ethylhexyl alcohol. Generally, the larger the alcohol portion of the ester, the sorer and more flexible the resultant resin. Also, generally, the methacrylic esters form harder films than the corresponding acrylic esters./ As examples of such resin, there may be cited polymethylmethacrylate, copolymers of methylmethacrylate with ethyl acrylate, butyl methacrylate, isobutyl methacrylate, acrylic acid or methacrylate acid, and the like. The most preferred PMMA resins are those which exhibit a viscosity of from 7 to 17 P in 40% solution in a 95:5 by weight mixture of toluene and ethylene glycol methyl ether.

The weight ratio of the VdFC to the compatible resin may vary widely from 90:10 to 60:40, preferably from 75:25 to 65:35, most preferably of about 70:30.

The resin component may additionally contain a flow promoting agent. Although a flow promoting agent is not essential to the invention, it helps obtain a high quality coating surface as required in some applications. As the flow promoting agent, there are generally used acrylic resins having a relatively low molecular weight (e.g., $M_w$ of about 20,000). The amount of flow promoting agent may vary widely from 0 to 3 wt % based on the total weight of the mixture, but the amount preferably used is of less than about 1 wt % based on the total weight of the coating product. The use of Kynar ADS® as substitute for flow promoting agent is known in the art from U.S. Pat. No. 5,229,460.

The use of pigments in the coating composition is preferable. Indeed, if no pigment is used, a clearcoat or varnish can be obtained; however, the resulting coating is unevenly milky, which is undesirable. Further, such clearcoats have a lesser resistance to high temperatures, and most important, they insufficiently absorb ultraviolet light which contributes to the degradation of the primer when primer is used. However, the use of ultrafine titanium dioxide to absorb ultraviolet light is known in the art.

When pigments are desired, any pigment or combination of pigments may be utilized. The choice of pigments should preferably be made in accordance with what is commercially available for PVdF-based coatings. The amount of pigment used may vary widely according to its hiding power. For example, a white topcoat prepared exclusively with titanium dioxide may require up to about 35 wt % of said pigment. Other pigments with better hiding properties may require lower amounts.

The process of preparing the powder coating product essentially comprises the steps of:

(i) melt-mixing the VdFC, the compatible components and the pigments;

(ii) forming pellets; and, (iii) grinding the pellets.

Melt-mixing is normally carried out by extrusion. Extruding and granulating the resulting mixture can be accomplished by the usual equipment and procedures. The operating procedure is easily determined by one skilled in the art. In particular, there may be used a single or double screw extruder. The processing temperature is usually from 150° C. to 190° C. The dimensions of the pellets are not critical; they are usually about 3 mm in diameter and 2 mm in length.

Grinding the pellets may be done by any suitable means which allows suitable sized particles to be obtained. Techniques for grinding are known to those skilled in the art and need not be described further. U.S. Pat. No. 5,229,460 contains a discussion of the state of the art of grinding fluoropolymer-based thermoplastic blends and the influence of the cooling step thereon. U.S. Pat. No. 5,229,460 is hereby incorporated by reference.

The powder should comprise particles of size and shape suitable for achieving constant flow through the application equipment, and to obtain a constant thickness of coating. It is preferred that the shape of the particles be as near to spherical as reasonably possible and their size be as uniform as possible because the resulting powder will have better flow properties. Regarding the size of the particles, the grinding step is followed by a sieving step for eliminating the largest size particles, i.e., those particles exceeding about three times the desired thickness of the coating. On the other hand, excessively small particles are to be avoided because they are a hazard to health and they tend to block transport lines during application.

It is preferable to use a hammer mill to grind the pellets, wherein a rotating shaft carries hammers which break the pellets on fixed shapes in the casing of the hammer mill and hammer them through a sieve lining at the bottom of the mill. Sieve openings of about 0.2 mm have been found particularly appropriate.

The resulting powder may be applied on the substrate by any means suitable for achieving an even distribution of the particles. In particular, there may be used any electrostatic spray application apparatus, whereby the charged particles are sprayed onto an oppositely charged substrate. Alternative techniques are cloud chamber, fluidized bed, even triboelectric coating, and the like. Such techniques are well known in the art and need not be described further.

The VdFC-based powder is preferably applied over a suitable primer, e.g., those known in the art as primers for similar fluorinated coatings, including solvent-based, "flash" or powder primers.

After the coating has been applied to the substrate, it must be subject to a heat treatment. The coated substrate is passed into a heated oven wherein the coating is finally baked, preferably at a temperature of from 160° C. to 220° C. The temperature used in this step should be higher than the melting point of the powder, which melting point is easily determined experimentally. On the other hand, the temperature should preferably not exceed 200° C. (220° C. at the most) because of the galvanized steel. The duration of the heating step is determined by any suitable method known in the art, taking into consideration that an insufficient duration is detrimental to the surface hardness and gloss.

Finally, the coating and its substrate can either be cooled slowly in air or quenched in water.

The coatings obtained show a good resistance to corrosion. That property is determined by the test procedure ASTM-B-117 (salt spray), using panels coated on both sides and evaluated according to ASTM D-714 (blister formation): the panels, previously notched with two crossed lines, are subjected to a salt spray (50 g/l NaCl) at a temperature of 35° C. The coatings obtained generally show a high gloss when baked correctly (i.e., for a sufficient period of time considering the temperature).

In order to further illustrate the invention, the following examples are given which are intended for the purposes of illustration only and not to limit the scope of the invention.

EXAMPLE 1 AND COMPARATIVE EXAMPLE A

The following white-pigment powder coating composition was prepared:

| | |
|---|---|
| fluorinated polymer | 54.9 pbw (parts by weight) |
| acrylic polymer | 23.3 pbw |
| flow improver | 0.7 pbw |
| titanium dioxide | 21.1 pbw |
| | 100.0 |

The flow improver is a low molecular weight copolymer of 30 wt % of ethyl acrylate monomer and 70 wt % of 2-ethylhexyl acrylate monomer, having a viscosity of about 1.06 Pa-s at 98.9° C.

The acrylic polymer is a commercially available thermoplastic copolymer of 70 wt % methyl methacrylate monomer and 30 wt % of ethyl acrylate monomer, having a viscosity of about 12 P in 40% solution in a 95:5 by weight mixture of toluene and ethylene glycol methyl ether. In Example 1, the fluorinated polymer is a copolymer of vinylidene fluoride and hexafluoropropene having the following characteristics:

VDF/HFP molar ratio: 93:7 (NMR determination according to Pianca et al., Polymer 28, 224, 1987)
melt flow index: 8.5 g/10 min (ASTM D-1238; 230° C., 2.16 kg)
melt viscosity: 850 Pa-s (ASTM D-3835; 240° C., 100s$^{-1}$)
molecular weight (GPC):
 $M_n = 49,000$   $M_2 = 112,000$   $M_z = 217,000$
tensile properties (ASTM D-638 M on a 2 mm thick pressed sheet):

| | |
|---|---|
| tensile stress at yield | 16 MPa |
| ultimate tensile strength | 34 MPa |
| elongation at yield | 14% |
| elongation at break | 650% |
| modulus | 360 MPa | flexural properties (ASTM D-790 on a 4 mm thick pressed sheet):

| | |
|---|---|
| maximum load | 30 MPa |
| modulus | 380 MPa |

DSC measurements (ASTM D-3418):

| | |
|---|---|
| melting point | 134° C. |
| fusion heat | 23 J/g |
| crystallization point | 97° C. |
| crystallization heat | 25 J/g |
| brittleness temperature (ASTM D-746 A): | −23° C. |

In Comparative Example A, the fluorinated polymer was a vinylidene fluoride homopolymer commercially available from ATOCHEM NORTH AMERICA under the tradename KYNAR 710.

The resulting mixtures were extruded under the following conditions, giving pellets of 3 mm in diameter and about 2 mm in length:

twin screw extruder
screw rotation: 200 rpm
load: 85%
temperature profile: 160° C. at hopper exit, rising to 190° C. in the middle of the screw, then 180° C. at the end of the screw
temperature of the material at the exit: 180° C..

The pellets were cooled in liquid nitrogen down to about −150° C., then milled at a temperature of about −100° C. in a hammer mill and sieved to eliminate particles larger than about 150 mm. In the hammer mill, a rotation shaft carries hammers which break the pellets on fred shapes in the casing of the hammer mill and hammer them through a sieve lining at the bottom of the hammer mill. The particle size distribution was: 99% of the particles had a size below 90 μm, and 40% below 32 μm. Only 5% had a size below 15 μm.

The resulting powders were applied by an electrostatic spray process on both sides of a 1 mm thick Sendzimer steel plate having a 25 μm thick zinc layer, covered by a 50 μm layer of an epoxy primer. The epoxy primer had been prepared and applied according to example 1 of Applicants' European Patent EP404752A, which is incorporated herein by reference.

In Example 1, the coated substrate was then heated 15 minutes at 200° C. (air temperature), giving a 80 μm thick top coating.

In Comparative Example A, the coated substrate was then heated 15 minutes at 230° C. (air temperature), giving an 80 μm thick top coating.

The following results were obtained:

|  | Example 1 | Comp. ex. A | Test Method |
| --- | --- | --- | --- |
| 60° gloss | 62 | 38 | ISO 2813 |
| salt spray corrosion (1000 h) | none | 7–12 mm | ASTM B-117 |

EXAMPLE 2 and COMPARATIVE EXAMPLE B

Example 1 and Comparative Example A were repeated, except that (i) the powder coatings were applied on both sides of 1 mm thick thermally galvanized steel plates having a 40μm thick zinc layer, and (ii) the fluoropolymer used in Example 2 was a commercially available copolymer of vinylidene fluoride and tetrafluoroethylene having the following characteristics as shown on the technical datasheet:

| melting point | 122–126° C. (ASTM D-3418) |
| --- | --- |
| fusion heat | 12.5–20.9 J/g (ASTM D-3417) |
| tensile properties (ASTM D-638 and D-1708 at 25° C.): | |
| tensile stress at yield | 14.5–18.6 MPa |
| ultimate tensile strength | 32.4–44.8 MPa |
| elongation tensile strength | 500–800% |
| modulus | 414–552 MPa |

The following results were obtained:

|  | Example 2 | Comp. Ex. B | Test Method |
| --- | --- | --- | --- |
| 60° gloss | 60 | 35 | ISO 2813 |
| salt spray corrosion (1000 h) | none | 3–8 mm | ASTM B-117 |

In the foregoing examples and written description, the following units were abbreviated as indicated:

| Viscosities | |
| --- | --- |
| | Energy |
| Poise - P | Joules - J |
| Pascal-seconds - Pa-s | Joules per gram - J/g |
| Decipascal-seconds - dPa-s | |
| Millipascal-seconds - mPa-s | Pressure & Force |
| Megapascal-seconds - MPa-s | Pascals - Pa |
| | Megapascals - MPa |

We claim:

1. Fluorinated powder coating product for galvanized steel, consisting essentially of:
   (a) a resin component consisting essentially of:
      (i) from 60 to 90 wt % of at least one vinylidene fluoride copolymer having a melting temperature below about 150° C. and a melt viscosity greater than about 400 Pa-s at 100 sec$^{-1}$ and 232° C., but less than about 1000 Pa-s at 100 sec$^{-1}$ and 232° C.;
      (ii) from 40 to 10 wt % of at least one compatible resin; and,
   (b) from 1 to 35 parts by weight of at least one pigment per 100 parts by weight
   of the resin component.

2. Fluorinated powder coating product according to claim 1, wherein the copolymers are prepared with 75 to 95 wt % of vinylidene fluoride monomer, with 25 to 5 wt % of at least one comonomer selected from tetrafluoroethylene and hexafluoropropene.

3. Fluorinated powder coating product according to either of claim 1 or 2, wherein the copolymers have a tensile modulus lower than about 800 MPa.

4. Fluorinated powder coating product according to either of claim 1 or 2, wherein the copolymers are copolymers of vinylidene fluoride with hexafluoropropene, and said copolymers have polydispersity values $U_z$ lower than 1.0, and $U_n$ lower than about 1.6.

5. Fluorinated powder coating product according to either of claim 1 and 2, wherein the copolymers are copolymers of vinylidene fluoride with hexafluoropropene and have a melting temperature $T_M$ of about $107+68\ e^{-0.14X}$, wherein X is the weight percentage of hexafluoropropene in the copolymer as calculated from NMR data by the method of Pianca et al.

6. Fluorinated powder coating product according to either of claim 1 or 2, wherein the compatible thermoplastic resin is polymethylmethacrylate.

7. Fluorinated powder coating product according to either of claim 1 or 2, wherein the weight ratio of copolymer to resin is about 70:30.

\* \* \* \* \*